United States Patent
Yu et al.

(10) Patent No.: US 11,402,948 B2
(45) Date of Patent: Aug. 2, 2022

(54) ELECTRONIC DEVICE AND INFORMATION PROCESSING METHOD

(71) Applicant: Lenovo (Beijing) Co., Ltd., Beijing (CN)

(72) Inventors: Zhou Yu, Beijing (CN); Zhihu Wang, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 114 days.

(21) Appl. No.: 16/829,514

(22) Filed: Mar. 25, 2020

(65) Prior Publication Data

US 2020/0310620 A1 Oct. 1, 2020

(30) Foreign Application Priority Data

Mar. 25, 2019 (CN) .......................... 201910227883.2

(51) Int. Cl.
- G06F 3/041 (2006.01)
- G06F 3/02 (2006.01)
- G06F 3/0354 (2013.01)
- G06V 40/13 (2022.01)

(52) U.S. Cl.
CPC ........ G06F 3/04186 (2019.05); G06F 3/0227 (2013.01); G06F 3/03547 (2013.01); G06V 40/1306 (2022.01)

(58) Field of Classification Search
CPC .............. G06F 3/04186; G06F 3/0227; G06F 3/03547; G06F 3/0416; G06K 9/0002
See application file for complete search history.

(56) References Cited

U.S. PATENT DOCUMENTS

| | | | | |
|---|---|---|---|---|
| 2012/0154274 A1* | 6/2012 | Iwamoto | ................. | G06F 1/169 345/157 |
| 2013/0194206 A1* | 8/2013 | Chang | ................. | G06F 3/04883 345/173 |
| 2015/0149968 A1* | 5/2015 | Sun | ..................... | G06F 3/04883 715/863 |
| 2018/0018060 A1* | 1/2018 | Luo | ..................... | G06F 3/03547 |
| 2021/0247888 A1* | 8/2021 | Peng | ................... | G06F 3/04886 |

FOREIGN PATENT DOCUMENTS

| | | |
|---|---|---|
| CN | 104035695 A | 9/2014 |
| CN | 104598076 A | 5/2015 |
| CN | 105092475 A | 11/2015 |
| CN | 105704468 A | 6/2016 |
| CN | 106104419 A | 11/2016 |
| CN | 205988398 U | 3/2017 |
| CN | 109190501 A | 1/2019 |

* cited by examiner

*Primary Examiner* — Carolyn R Edwards
(74) *Attorney, Agent, or Firm* — Anova Law Group, PLLC (57) ABSTRACT

An electronic device includes a first input module located at a first region, a second input module located at a second region, a detection module, and a processing module. The detection module is configured to transmit a first signal to the first region and the second region and receive a second signal returned based on the first signal. The processing module is connected to the detection module and configured to analyze the second signal to obtain an analysis result, and shield input information of the first input module or the second input module according to the analysis result.

16 Claims, 2 Drawing Sheets

ELECTRONIC DEVICE AND INFORMATION PROCESSING METHOD

CROSS-REFERENCE TO RELATED APPLICATION

This application claims priority to Chinese Patent Application No. 201910227883.2, filed on Mar. 25, 2019, the entire content of which is incorporated herein by reference.

TECHNICAL FIELD

The present disclosure relates to the technical field of electronics and, more particularly, to an electronic device and an information processing method.

BACKGROUND

With the development of electronic technology, to facilitate various input by a user, an electronic device may contain multiple input modules. In some situations, these input modules may be located on a same surface of the device. As such, a false touch may happen. The false touch may cause an unnecessary false response of the electronic device. Therefore, how to reduce the false contact and false response is a problem that needs to be solved.

SUMMARY

Embodiments of the present disclosure provide an electronic device including a first input module located at a first region, a second input module located at a second region, a detection module, and a processing module. The detection module is configured to transmit a first signal to the first region and the second region and receive a second signal returned based on the first signal. The processing module is connected to the detection module and configured to analyze the second signal to obtain an analysis result and shield input information of the first input module or the second input module according to the analysis result.

Embodiments of the present disclosure provide an information processing method including transmitting a first signal to a first region with a first input module and a second region with a second input module, receiving a second signal returned based on the first signal, analyzing the second signal to obtain an analysis result, and shielding input information of the first input module or the second input module according to the analysis result.

Embodiments of the present disclosure provide a computer readable storage medium storing a computer, storing a computer program. The computer program is executed by an electronic device to transmit a first signal to a first region with a first input module and a second region with a second input module, receive a second signal returned based on the first signal, analyze the second signal to obtain an analysis result, and shield input information of the first input module or the second input module according to the analysis result.

DETAILED DESCRIPTION OF THE EMBODIMENTS

Technical solutions of the present disclosure are further described in detail in conjunction with the specification and specific embodiments.

Figure 1:
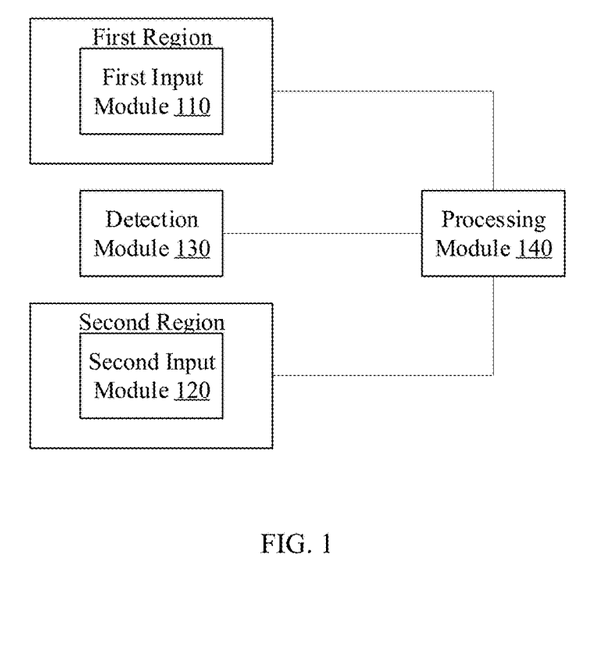
FIG. 1 is a schematic structural diagram of an electronic device according to embodiments of the present disclosure.

As shown in FIG. 1, the embodiments of the present disclosure provide an electronic device. The electronic device includes a first input module 110 located at a first region, a second input module 120 located at a second region, a detection module 130, and a processing module 140. Detection module 130 is configured to transmit a first signal to the first region and the second region and receive a second signal returned based on the first signal. Processing module 140 is connected to detection module 130 and configured to analyze the second signal to obtain an analysis result and shield input information of first input module 110 and/or second input module 120 according to the analysis result. In some embodiments, first input module 110 and second input module 120 may be two independent input structures for users to input information.

For example, in some embodiments, first input module 110 may be a keyboard, and second input module 120 may be a touchpad, or first input module 110 may be a touchpad, and second input module 120 may be a keyboard.

In some embodiments, first input module 110 and second input module 120 may be two input modules of the electronic device disposed adjacently. When the user operates one input module, the user may accidentally touch another input module, which leads to a false input. By using the electronic device consistent with the embodiments of the present disclosure, the false user touch and false detection can be reduced. This improves input accuracy of the input modules.

In some embodiments, an area of the first region occupied by first input module 110 is larger than an area of the second region occupied by the second input module 120.

In some embodiments, the first region and the second region may both be rectangular regions. The second region may be at a center position of an edge of the first region.

In some embodiments, first input module 110 and second input module 120 may be different uses of the touchpad or the input structures suitable for different application scenarios.

Detection module 130 may be various types of sensors capable of detecting presence of foreign objects in the first region and the second region. Detection module 130 may include one or a plurality of sensors.

In some embodiments, detection module 130 may be a sensor, which can transmit a wireless signal and determine the presence of the foreign objects in the first region and the second region based on signal status of a returned signal of the wireless signal.

In some embodiments, detection module 130 may transmit the first signal to the first region and the second region simultaneously. The first signal may be a wireless signal of various frequencies.

When a foreign object enters at least one of the first region and the second region, detection module 130 transmits the first signal to a corresponding region, such that a second signal is returned. Detection module 130 can receive the returned second signal.

After detection module 130 receives the second signal, processing module 140 performs a comprehensive analysis according to reception parameters of the second signal in combination with transmission parameters of the first signal.

Processing module 140 may include various devices having a signal processing functions. For example, processing module 140 includes but is not limited to a microprocessor, a specific integrated circuit, a programmable array or digital signal processor.

Processing module 140 may be a processing module 140 integrated with detection module 130. For example, processing module 140 may be a processing module 140 that is packaged integrally with detection module 130. In another example, processing module 140 and detection module 130 may be two separate modules. The two independent devices are connected through a bus penetrating respective packages of processing module 140 and detection module 130.

In some embodiments, processing module 140 is configured to determine whether the second signal is from the first region or the second region according to a reception direction of the second signal.

In some embodiments, further according to transmission time of the first signal in combination with returning time of the second signal, processing module 140 is further configured to determine a distance from the foreign object, which enters the first region or the second region, to detection module 130.

In the embodiments, if processing module 140 determines that the user operates first input module 110 according to the analysis result, to reduce the false touch, processing module 140 may shield input information of second input module 120. If processing module 140 determines that the user operates second input module 120 according to the analysis result, to reduce the false touch, processing module 140 may shield input information of first input module 110. If processing module 140 determines that the user operates first input module 110 and second input module 120 simultaneously according to the analysis result, to not affect two information input methods of the user, processing module 140 does not shield the information input of first input module 110 and the information input of the second input module 120. If processing module 140 determines that the user does not operate both of first input module 110 and the second input module 120, to timely respond to an input requirement of any information input method that the user may generate at any time, processing module 140 also does not shield the information input of first input module 110 and the information input of the second input module 120.

For example, when the user operates the touchpad with a single hand, fingers may touch edge part of the keyboard close to the touchpad by mistake. According to the analysis result, if processing module 140 determines that the second signals above a certain ratio are from the second region, processing module 140 shields the information input of first input module 110.

In another example, the second signal is received from the second region, but a time interval of the reception time of the second signal and the transmission time of the first signal is long (e.g., longer than a time threshold). In this situation, the user may not need to operate first input module 110 and the second input module 120. To ensure a response of the information input requirement of any input method that the user may generate at any time, processing module 140 also does not shield the information input of first input module 110 and the information input of the second input module 120.

The electronic device provided by the embodiments may transmit the first signal, receive the second signal, and shield the information input of one of the two input modules according to the comprehensive analysis. The electronic device can reduce the false touch and improve user experience.

In some embodiments, processing module 140 is configured to respond to a first input operation detected by first input module 110 and shield a second input operation detected by the second input module 120, when a strength of the second signal returned from the first region reaches a first strength condition.

The analysis of the second signal by processing module 140 may include analysis of the various reception parameters. In the embodiments, the intensity of the received second signal is analyzed. According to the analysis of the intensity, processing module 140 determines whether to shield information input of an input module, or to shield information input of at least one input module. Processing module 140 determines to shield information input of which input modules. The analysis of the signal intensity is simple.

Further, processing module 140 is configured to respond to the first input operation detected by first input module 110 and shield the second input operation detected by the second input module 120, when the strength of the second signal returned from the first region reaches the first strength condition, and the strength of the second signal returned from the second region does not reach a second strength condition.

Assuming that first input module 110 is a keyboard, and second input module 120 is a touchpad, when the user taps the keyboard with both hands, thumbs are placed gently at the space bar, and bases of both hands may slightly obstruct the touchpad. Therefore, the strength of the second signal returned from the second region, where the second input module is located, is not zero. Compared to a situation that most of the hands are placed at the keyboard, the strength of the second signal returned from the first region is stronger. Therefore, it is beneficial to improve accuracy of determining that the user types on the keyboard.

In some embodiments, when the strength of the second signal reaches the first strength condition, the strength of the second signal may be larger than a first intensity threshold. When the strength of the second signal reaches the second strength condition, the strength of the second signal may be larger than a second intensity threshold.

In some embodiments, when the strength of the second signal returned from the first region reaches the first strength condition, and the strength of the second signal returned from the second region does not reach the second strength condition, the intensity of the first signal from the first region may be stronger than the intensity of the first signal of the second region.

Detection module 130 may be in the second region. In the embodiments, detection module 130 is in the second region, but detection module 130 can transmit the first signal to the first region and the second region simultaneously.

Further, detection module 130 may be in the second region close to an edge of the first region. Therefore, detection module 130 is easier to transmit the first signal to the first region and the second region simultaneously, which can lower a requirement on transmission power of detection module 130.

In some embodiments, detection module 130 is in a third region between the first region and the second region.

The embodiments introduce the third region, which may be an individual region from the first region and the second region. In the embodiments, since the third region is individual from the first region and the second region, a clear dividing line is visible on a surface of the electronic device.

For example, in some embodiments, first input module 110 located in the first region, second input module 120 located in the second region, and detection module 130 located in the third region all have surface shells. These surface shells are individual from each other. Edges of these surface shells are the dividing lines of the first region, second region, and the third region.

If detection module 130 is located at the second region, detection module 130 may share a surface shell with the second input module 120.

Figure 2:
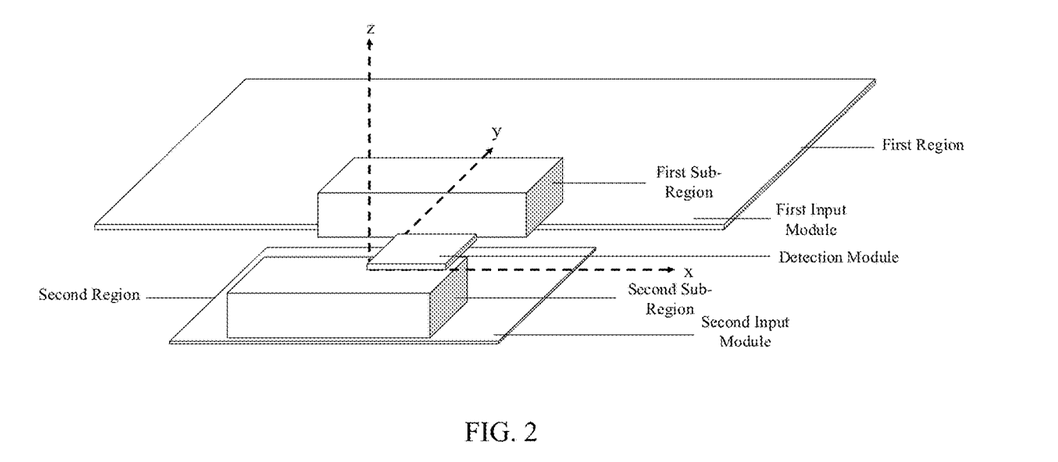
FIG. 2 is a schematic structural diagram of another electronic device according to embodiments of the present disclosure.

In some embodiments, as shown in FIG. 2, detection module 130 is configured to transmit the first signal to a first sub-region and a second sub-region, where a connection line between the first sub-region and the second sub-region passes through a region where the detection module is. The first sub-region is a sub-region of the first region adjacent to where detection module 130 is. The second sub-region is a sub-region of the second region.

In the embodiments, to reduce a requirement for transmitting capability of detection module 130 and reduce cost and volume of hardware of detection module 130, detection module 130 only needs to transmit the first signal to a part of sub-regions of the first and second regions.

In the embodiments, the first sub-region is a part of the first region, and the second sub-region is a part of the second region. Therefore, detection module 130 does not need to transmit the first signal to the whole first region and/or the second region.

The first sub-region and the second sub-region are both regions close to the region where detection module 130 is.

For example, detection module 130 is located at the third region, and the first sub-region and the second sub-region are adjacent regions of the third region. Therefore, in one aspect, detection module 130 can easily transmit the first signal, which covers the first sub-region and the second sub-region. In another aspect, the first sub-region and the second sub-region are high frequency regions of the false touch, and also high frequency regions, where the user operates first input module 110 and/or the second input module 120. Detection module 130 just needs to transmit the first signal to the first sub-region and the second sub-region to accurately detect which input module the user operates operated or needs to operate.

In some embodiments, detection module 130 is further configured to collect a biological characteristic of an object collected on the surface of detection module 130.

In the embodiments, detection module 130 is further configured to detect the biological characteristic of the collection object on the surface of detection module 130. The biological characteristic may be any one biologic characteristic, which can uniquely identify the collection object, and also may be a biologic characteristic, which can characterize life status information of the collection object.

In some embodiments, the biological characteristic includes but is not limited to a fingerprint, a blood vessel characteristic, a bone characteristic, etc.

In the embodiments, detection module 130 has two functions at the same time, such that it realizes sharing of the two functions of one module, and has a compact structure.

In some embodiments, detection module 130 has a first work mode and a second work mode. When detection module 130 is at the first work mode, detection module 130 transmits a first wireless wave to the first region and the second region and receives the second signal returned based on the first signal. When detection module 130 is at the second work mode, detection module 130 transmits a third signal wave to the third region, where detection module 130 is, and receives a fourth signal returned after the wireless wave acts at the collection object. Processing module 140 is further configured to determine the biological characteristic of the collection object based on the second returned wave.

In some embodiments, detection module 130 may not distinguish the work modes. The processing module uses a wireless signal to trigger shielding of the input information of first input module 110 and/or second input module 120 in the previous embodiments, and at the same time, to detect the biological characteristic.

For example, in some embodiments, after processing module 140 receives the second signal, processing module 140 also analyzes a returning region and/or a distance of the second signal. With combination of one of the returning region and/or the distance, processing module 140 determines that whether the second signal is directly returned from the region (e.g., the third region) where the detection module is. If the second signal is returned from the third region where the detection module is, processing module 140 performs the analysis based on the second signal returned from the region where detection module 130 is to obtain the biologic characteristic.

In the embodiments, to ensure robustness and reliability of implementation of the two functions of detection module 130, the two work modes of detection module 130 are distinguished.

If at the first work mode, detection module 130 is activated to implement a function of triggering shielding and detection of the input information of first input module 110 and/or second input module 120 in the previous embodiments. If at the second work mode, detection module 130 is activated to detect the biological characteristic.

In the embodiments, detection module 130 can automatically switch between the two work modes according to external input instructions, and can also automatically switch between the two work modes according to internal instructions.

For example, a physical key for switching the work modes of detection module 130 is disposed on a surface of the electronic device. The external input instructions are received from the physical key. In another example, the electronic device including detection module 130 receives the external input instructions from other devices. For example, the user uses a cell phone to transmit the external input instruction to a notebook or a tablet.

In another example, after detection module 130 is activated, detection module 130 may switch under the two work modes based on the internal instructions according to a pre-set time interval, such that different requirements of the two functions of the user can be satisfied.

In some embodiments, detection module 130 is configured to transmit the first signal of a first frequency to the first region and the second region and receive the second signal returned based on the first signal at the first work mode. Detection module 130 is configured to transmit the third signal of a second frequency to the third region and receive the fourth signal returned based on the third signal at the second work mode. The first frequency is different from the second frequency.

In some embodiments, at the two work modes, detection module 130 transmits the wireless signals with different frequencies. A wavelength or frequency of the wireless signal for detecting a biological characteristic may be a specific value. Therefore, in the embodiments, to take into account efficiency, accuracy, and stability of biological characteristic detection, detection module 130 switches the frequency of the transmitted wireless signal synchronously when the working mode is switched.

In other embodiments, at the two work modes, detection module 130 transmits the wireless signals with different frequencies. For example, when detecting the biological characteristic, due to a closer distance, transmit power may be appropriately lowered.

In other embodiments, detection module 130 is an ultrasonic wave module for transmitting an ultrasonic wave. A first frequency is lower than a second frequency. For example, the first frequency may be 400 Khz to 600 Khz. In some embodiments, the first frequency may be 500 Khz. The second frequency may be 8 Mhz to 12 Mhz. in some embodiments, the second frequency may be 10 Mhz.

In the embodiments, detection module 130 is the ultrasonic wave module and can transmit the ultrasonic wave. By transmitting different ultrasonic waves, the two functions can be better implemented.

In some embodiments, the electronic device further includes a sensing layer, and processing module 140. The sensing layer is located at a top of the ultrasonic wave module and configured to detect touch of a collection object at the third region to form a touch signal. Processing module 140 is connected to the sensing layer, and configured to control detection module 130 to enter the second work mode based on the touch signal and control detection module 130 to enter the first work mode after detecting the biological characteristic. Processing module 140 is further configured to control detection module 130 to switch between the first work mode and the second work mode of the electronic device according to the pre-set switch time interval.

Assume that a pre-set switch time interval from the first work mode to the second work mode is a first switch time interval, and a pre-set switch time interval from the second work mode to the first work mode is a second switch time interval. Two methods of the pre-set the switch time interval are as follows. First, the first switch time interval is equal to the second switch time interval. Second, the first switch time interval is not equal to the second switch time interval.

For example, in a pre-set time range of using initiation time of the electronic device as starting time, the first switch time interval is equal to the second switch time interval. For example, the user may require biometric authentication for initiation and login, etc. After a certain time, the first switch time interval may become smaller than the second switch time interval to better satisfy an information input requirement of the user.

In the embodiments, the first switch time interval and the second switch time interval are pre-set before switching. A specific determining process may be dynamic and can perform automatic adjustment according to application requirements of the electronic device. For example, the pre-set time interval is increased or reduced according to a pre-set time step. In another example, dynamic selection is performed among several pre-set time interval values.

In the embodiments, detection module 130 is configured with the sensing layer at a position at the top, which may be in contact with the collection object. Detection module 130 generates corresponding touch signals when signals sensed by the sensing layer are different. Processing module 140 can control detection module 130 to switch between the first work mode and the second work mode according to the sensing layer. Processing module 140 reduces unnecessary switching, and has a lower switching frequency and more accurate switching control.

The sensing layer includes various sensors capable of detecting the touch. The sensors include but is not limited to at least one of a touchpad, a pressure sensor, a capacitive sensor, etc.

In some embodiments, processing module 140 is further configured to maintain the pre-set time of detection module 130 at the first work mode, when detection module 130 detects that the strength of the second signal reaches a third strength condition at the first work mode.

In the embodiments, biological characteristic detection is a close detection with a closer distance than the detection of the second signal. If the intensity of the detected second signal reaches the third strength condition, a part of the user for detecting the biological characteristic is near detection module 130. In the embodiments, when the strength of the second signal reaches the third strength condition, the strength of the second signal may be larger than the intensity of the third signal. In some embodiments, the intensity of the third signal is larger than the intensity of the previously mentioned first signal and/or the strength of the second signal.

In some embodiments, first input module 110 is a keyboard with one or a plurality of keys, and second input module 120 includes one or a plurality of touch pads. In other embodiments, first input module 110 includes one or a plurality of touch pads, and second input module 120 is a keyboard with one or a plurality of keys.

The keyboard may be a physical keyboard or a virtual keyboard. The physical keyboard includes physical keys. The virtual keyboard includes but is not limited to a light and shadow keyboard, for example, a light and shadow keyboard formed by projection.

The keyboard includes but is not limited to at least one of letter keys, number keys, punctuation keys, and function keys, where the function keys include but is not limited to at least one of physical keys having specific functions such as a home key, a page up key, a page down key, etc.

Figure 3:
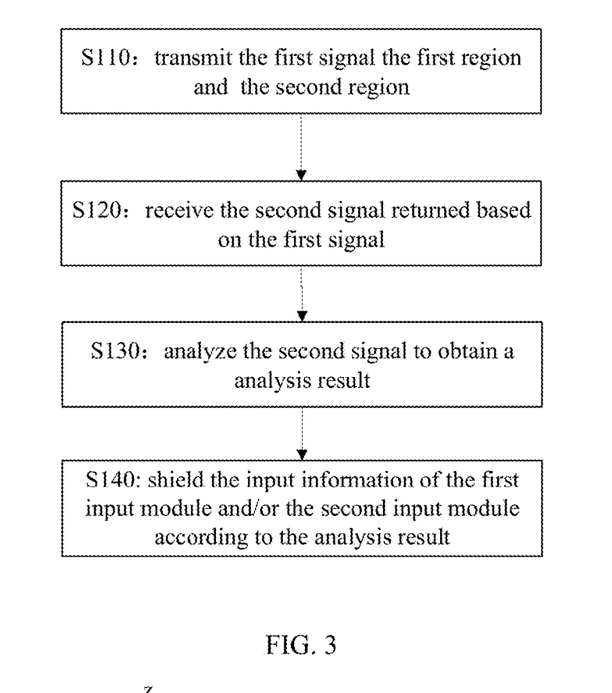
FIG. 3 is a flowchart of an information processing method according to embodiments of the present disclosure.

As shown in FIG. 3, the embodiments of the present disclosure provide a method for processing information. The method includes at S110, transmitting the first signal to the first region where first input module 110 is and the second region where second input module 120 is, at S120, receiving the second signal returned based on the first signal, at S130, analyzing the second signal to obtain a analysis result, and at S140, shielding the input information of the first input module and/or the second input module according to the analysis result.

The information processing method provided by the embodiments is used in the electronic devices provided by any of the previously mentioned embodiments.

First, detection module 130 transmits the first signal to the first region and the second region where first input module 110 and second input module 120 are located. If a user operates a corresponding input module at the first region and the second region, the first signal is reflected after encountering operating bodies such as the user's hands, an operating pen, etc., so that a transmission direction of the wireless signal changes, and the wireless signal is returned back to detection module 130. Detection module 130 can receive the second signal returned based on the first signal.

After receiving the second signal, processing module 140 analyzes the second signal. For example, processing module 140 analyzes which of the first region and the second region the second signal is from. In another example, processing module 140 analyzes a difference between transmission time of the first signal and reception time of the second signal. In another example, processing module 140 analyzes the strength of the second signal.

In some embodiments, processing module 140 obtains an analysis result by analyzing the second signal, and the analysis result may characterize whether the current user operates the input module, or which specific input module the current user operates. To reduce errors, the processing module of the electronic device shield the input information of at least one of first input module 110 and the second input module 120. In some embodiments, processing module 140 at least shields the input information of the input module, which the user does not want to operate but false touches.

In some embodiments, process S140 may include if the strength of the second signal returned from the first region reaches the first strength condition, responding to a first input operation detected by first input module 110 of the first region, and shielding a second input operation detected by the second input module located at the second region.

In some embodiments, process S130 at least analyzes the strength of the second signal and determines the input module of the information input required to be shielded according to the signal intensity analysis.

In other embodiments, process S140 may include if the strength of the second signal returned from the first region reaches the first strength condition, and the strength of the second signal returned from the second region does not reach the second strength condition, responding to the first input operation detected by the first input module located at the first region, and shielding the second input operation detected by the second input module located at the second region.

Further, in some embodiments, process S120 may include using detection module 130 at the first work mode to transmit the first signal to the first region and the second region and receive the second signal returned based on the first signal.

In some embodiments, when detection module 130 is at the first work mode, detection module 130 needs to transmit the first signal to the first region and the second region. If detection module 130 is at the second work mode, detection module 130 may only transmit the first signal within its own range.

In other embodiments, the method further includes using detection module 130 at the second work mode to transmit the third signal to the region where detection module 130 is located, receiving the fourth signal generated by acting the wireless wave at the collection object placed in the region where the detection module is located, and determining the biological characteristic of the collection object according to the fourth signal.

Placing the collection object in the region where detection module 130 is located includes that the collection object fits at a surface of detection module 130, or the collection object is located above detection module 130 and has a certain distance from detection module 130.

In some embodiments, the method further includes detecting the touch operation acting at detection module 130 to obtain the touch signal, and if the touch signal is detected, controlling the detection module to enter the second work mode.

In other embodiments, the method further includes, after detecting the biological characteristic, controlling detection module 130 to enter the first work mode.

In some embodiments, according to the touch signal, detection module 130 is triggered accurately to switch between the first work mode and the second work mode.

The method further includes, according to the pre-set switch time interval, controlling detection module 130 to switch between the first work mode and the second work mode.

In other embodiments, processing module 140 of the electronic device may control the detection module to switch between the first work mode and the second work mode according to the pre-set switch time interval, which is equivalent to alternately controlling detection module 130 to perform the two different functions.

In some embodiments, the method further includes when detection module 130 detects that the strength of the second signal reaches the third strength condition at the first work mode, maintaining the pre-set time of detection module 130 at the first work mode.

In some embodiments, when the electronic device controls detection module 130 to switch between the two work modes, if the signal strength of the second signal returned based on the first signal reaches the third strength condition at the first work mode, the current user is considered to perform biological characteristic detection, and detection module 130 exists the first work mode and enters the second work mode.

Several specific examples are provided in combination with the described embodiments.

Example 1 is about a relative position of an ultrasonic fingerprint module and a touchpad.

The ultrasonic fingerprint module serves as an interactive structure for monitoring.

Embodiments described in this example do not increase hardware costs and present desirable product appearance and function.

By using the strong penetrating property of the ultrasonic signals emitted by the ultrasonic fingerprint module, the ultrasonic module may be disposed between a keyboard and a touchpad. The ultrasonic module may be disposed near a position indicated in FIG. 4. By adding this monitoring, the user's behavior can be more precisely detected. Finally, the structure of the existing electronic device is used to reduce the false touch to the touchpad, when the user operates the keyboard and avoid tedious setting and switching operations.

Figure 4:
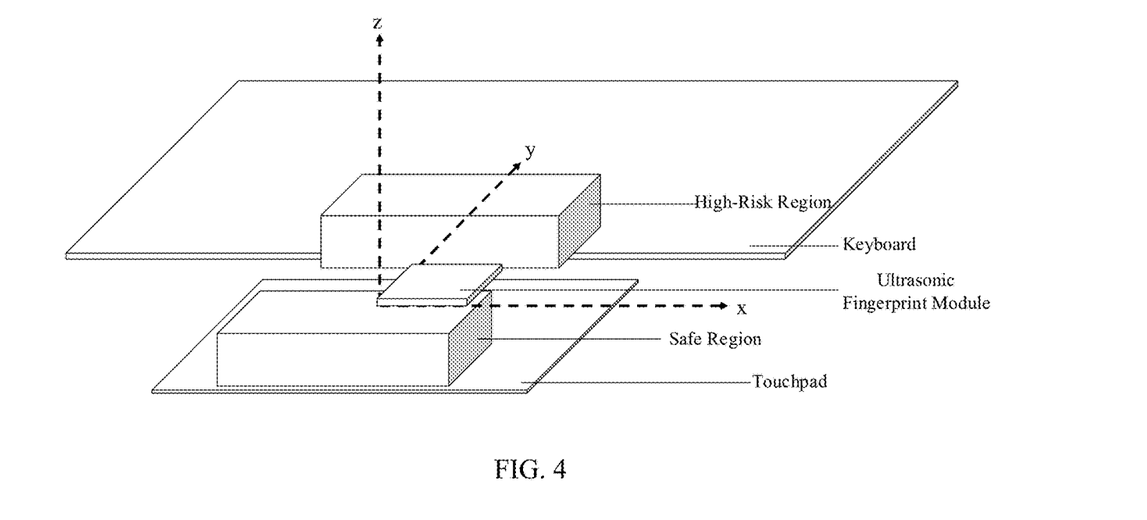
FIG. 4 is a schematic structural diagram of an electronic device according to embodiments of the present disclosure.

The ultrasonic fingerprint module may be disposed above the middle of the touchpad (as shown in FIG. 4) and generally placed to hide under the touchpad. There are at least two reasons to place the ultrasonic fingerprint module at this position. First, sensing of the false touch and matching algorithm are avoided. Second, this region is a non-important region in use of the touchpad, which has a small or no impact on actual use experience. To embed the ultrasonic fingerprint module, a printed circuit board (PCB) of the touchpad can be cut out, so the touchpad function at this region will be lost. Therefore, the ultrasonic fingerprint module should be as close to upper as possible and as small as possible In some embodiments, the ultrasonic fingerprint module may also be disposed outside the region of the touchpad and close to the middle of the upper edge of the touchpad. The advantage of this position is that the position is further away from the touchpad, and disturbance due to different user habits is smaller. The response of the ultrasonic fingerprint module needs to be improved, such that transmission and reception angles are enlarged to cover a "high risk region" and a "safe region". Adjustment of the transmission angle is not a focus of logic of the embodiments and is not described.

When the user operates the keyboard, if hand palm may touch the touchpad accidentally, that is the false touch, which is the problem that the example focuses to solve.

A distinguishable condition at this time is that when a false touch occurs, the high-risk region shown in FIG. 4 can be monitored for signals. This event is worth to be referred to, monitored, and responded to.

When the user operates the touchpad normally, the signals of the high-risk region are not clear, because a large region of the hand palm does not invade into this region. In contrary, signals of the safe region are very clear, because fingers move frequently and determinedly.

In general, the situation of the high-risk region having signals but the safe region having no signal or weak signals is a false touch. The function of the touchpad should be closed in time to improve input experience.

Example 2 is a dual frequency ultrasonic fingerprint module provided based on example 1 to distinguish fingerprint detection and false touch detection. The dual frequency ultrasonic fingerprint module is capable of transmitting ultrasonic of two kinds of different frequencies.

For example, the dual frequency ultrasonic fingerprint module uses a frequency (high) about 10 MHz to sense fingerprint and uses a frequency (low) of 500 KHz for better transmission in the air to better sense an object in the air (usually hand palm and fingers).

Further, to achieve interference-free transmission of ultrasonic waves of two frequencies, the information processing method provided by the present example also includes designing a sensing layer at a part of a surface of the dual frequency ultrasonic fingerprint module, where the sensing layer may be a capacitive switch. When the sensing layer senses a signal, the dual frequency ultrasonic fingerprint module changes from a low frequency operation to a high frequency operation, which is a fingerprint sensing mode.

A default state is to alternate between high frequency and low frequency. When a valid signal is detected in a high frequency band, a low frequency monitoring is turned off.

In other situations, because of different hand palm sizes of users, typing habits, etc., positions and areas of signal waves, the high-risk region, and the safe region are different in the above-mentioned logic, therefore judging thresholds are different.

Further, machine learning and judging may be added to a software level to continuously optimize a shutdown judging threshold. An optimal status is to close the touch pad in time and accurately before a false touch.

The judging threshold includes any of the previously mentioned first intensity threshold, the second intensity threshold, and the third intensity threshold.

In other embodiments, the judging threshold may further be a distance threshold, a time threshold of the time different between the transmission time and the reception time, etc.

In some embodiments of the present disclosure, the disclosed devices and methods may be implemented through other methods. The above-mentioned device embodiments are merely illustrative. For example, the unit division is merely a logic function division, which may have other division methods in practical applications, e.g., multiple units or components can be combined, or can be integrated into another system, or some features can be ignored, or not implemented. In addition, the displayed or discussed components are coupled, directly coupled, or communicated with each other through some interfaces. The indirect coupling or communication connection of the device or unit may be electrical, mechanical, or other forms.

The units described above as separate components may or may not be physically separated. The components displayed as units may or may not be physical units, which may be located in one place or distributed to multiple network units. Some or all of the units may be selected according to actual needs to achieve the solution of the embodiments.

In addition, the functional units in the embodiments of the present disclosure may be all integrated into one processing module, or each unit may be separately used as a unit, and two or more units may be integrated into one unit. The above integrated unit may be implemented in the form of hardware, or in the form of hardware plus software functional units.

Those of ordinary skill in the art may understand that all or part of the processes of the above-mentioned method embodiments may be completed by a program instructing related hardware. The above-mentioned program may be stored in a computer-readable storage medium. When the program is executed, the device executes the processes of the above-mentioned method embodiments. The previously mentioned storage medium includes various media capable of storing program code such as a mobile storage device, a read-only memory (ROM), a random-access memory (RAM), a magnetic disk, an optical disk, etc.

The above are only the specific embodiments of the present disclosure, but the scope of the present disclosure is not limited to these specific embodiments. Any skilled in the art, within the technical scope disclosed by the present disclosure, can easily think of changes or replacements, which are within the scope of the present invention. Therefore, the scope of the present disclosure shall be subject to the scope of the claims.

What is claimed is:

1. An electronic device, comprising:
a first input module, located at a first region;
a second input module, located at a second region;
a detection module, configured to transmit a first signal to the first region and the second region and receive a second signal returned based on the first signal; and
a processing module, connected to the detection module and configured to analyze the second signal to obtain an analysis result and shield input information of the first input module or the second input module according to the analysis result, the processing module being configured to respond to a first input operation detected by the first input module and shield a second input operation detected by the second input module, in response to a strength of the second signal returned from the first region meeting a first strength condition,
wherein the detection module is configured to transmit the first signal to a first sub-region and a second sub-region, a connection line between the first sub-region and the second sub-region passing through a region with the detection module, the first sub-region being a sub-region of the first region adjacent to the detection module, and the second sub-region being a sub-region of the second region.

2. The electronic device of claim 1, wherein:
the detection module is located at the second region; or
the detection module is located at a third region between the first region and the second region.

3. The electronic device of claim 1, wherein:
the detection module is further configured to collect a biological characteristic of a collection object from a surface of the detection module;
the detection module has a first work mode and a second work mode, in the first work mode, the detection module transmitting a first wireless wave to the first region and the second region and receiving the second signal returned based on the first signal; and in the second work mode, the detection module transmitting a third signal to a third region with the detection module, and receiving a fourth signal returned by the collection object; and the processing module is further configured to determine the biological characteristic of the collection object based on the second signal or the fourth signal.

4. The electronic device of claim 3, wherein:
in the first work mode, the detection module is configured to transmit the first signal of a first frequency to the first region and the second region and receive the second signal returned based on the first signal;
in the second work mode, the detection module is configured to transmit the third signal of a second frequency to the third region and receive the fourth signal returned based on the third signal at the second work mode; and
the first frequency is different from the second frequency.

5. The electronic device of claim 4, wherein the detection module is an ultrasonic wave module for transmitting an ultrasonic wave, and the first frequency is lower than the second frequency, the electronic device further comprising:
a sensing layer, located at a top of the ultrasonic wave module and configured to detect touch of the collection object at the third region to form a touch signal.

6. The electronic device of claim 5, wherein:
the processing module, connected to the sensing layer, is configured to control the detection module to enter the second work mode based on the touch signal and, after detecting the biological characteristic, further control the detection module to enter the first work mode;
the processing module, is further configured to control the detection module to switch between the first work mode and the second work mode of the electronic device according to a pre-set switch time interval; or
the processing module, is further configured to maintain the detection module at the first work mode for a pre-set time period, when the detection module detects that strength of the second signal reaches a third strength condition at the first work mode.

7. The electronic device of claim 1, wherein:
the first input module is a keyboard with one or more keys; and
the second input module includes one or more touchpads.

8. An information processing method for an electronic device, comprising:
transmitting, by a detection module of the electronic device, a first signal to a first region with a first input module and a second region with a second input module;
receiving, by the detection module, a second signal returned based on the first signal;
analyzing, by a processing module of the electronic device, the second signal to obtain an analysis result;
in response to a strength of the second signal returned from the first region meeting a first strength condition, responding, by the processing module, to a first input operation detected by the first input module at the first region, and shielding, by the processing module, a second input operation detected by the second input module at the second region; and
wherein transmitting, by the detection module of the electronic device, the first signal to the first region and the second region includes transmitting, by the detection module, the first signal to a first sub-region and a second sub-region, a connection line between the first sub-region and the second sub-region passing through a region with the detection module, the first sub-region being a sub-region of the first region adjacent to the detection module, and the second sub-region being a sub-region of the second region.

9. The method of claim 8, further comprising:
in response to the strength of the second signal meeting a third strength condition at a work mode, maintaining the detection module at a work mode for a pre-set time period.

10. The method of claim 8, wherein receiving the second signal returned based on the first signal includes:
using the detection module at a work mode to transmit the first signal to the first region and the second region and receive the second signal returned based on the first signal.

11. The method of claim 8, further comprising:
using the detection module at a work mode to transmit a third signal to a region with the detection module;
receiving a fourth signal generated by a collection object placed in the region with the detection module; and
determining a biological characteristic of the collection object according to the fourth signal.

12. The method of claim 11, further comprising:
detecting a touch operation at the detection module to obtain a touch signal; and
controlling the detection module to enter the work mode.

13. The method of claim 11, further comprising:
after detecting the biological characteristic, controlling the detection module to enter a work mode.

14. A non-transitory computer-readable storage medium for storing a computer program that, when executed by a processor of an electronic device, causing the processor to:
transmit, by a detection module of the processor, a first signal to a first region with a first input module and a second region with a second input module;
receive, by the detection module, a second signal returned based on the first signal;
analyze, by a processing module of the processor, the second signal to obtain an analysis result;
in response to a strength of the second signal returned from the first region reaching a first strength condition, respond, by the processing module, to a first input operation detected by the first input module at the first region, and shield, by the processing module, a second input operation detected by the second input module at the second region; and
wherein when transmitting, by the detection module of the processor, the first signal to the first region with the first input module and the second region with the second input module, the processor is further caused to transmit, by the detection module, the first signal to a first sub-region and a second sub-region, a connection line between the first sub-region and the second sub-region passing through a region with the detection module, the first sub-region being a sub-region of the first region adjacent to the detection module, and the second sub-region being a sub-region of the second region.

15. The non-transitory computer-readable storage medium of claim 14, wherein the processor is further configured to: in response to the strength of the second signal reaching a third strength condition at a work mode, maintain the detection module at the work mode for a pre-set time period.

16. The non-transitory computer-readable storage medium of claim 14, wherein the processor is further configured to:
use the detection module at a work mode to transmit the first signal to the first region and the second region and receive the second signal returned based on the first signal.

* * * * *